(No Model.)
W. ROWAN.
PISTON.
No. 273,161. Patented Feb. 27, 1883.
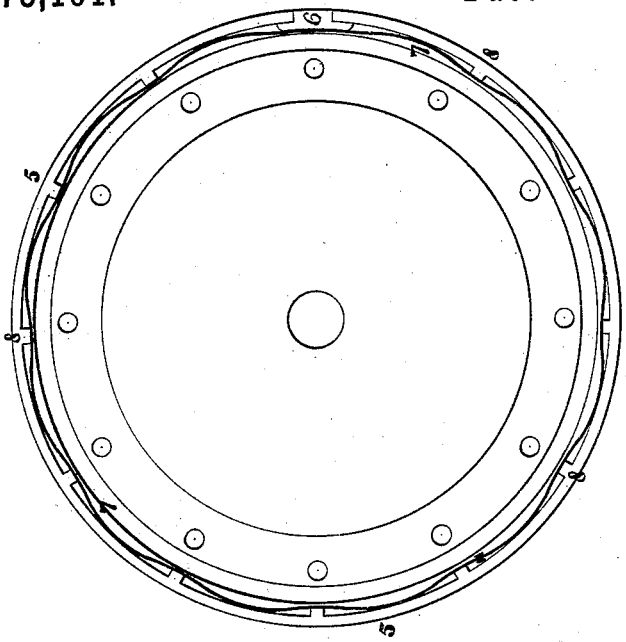
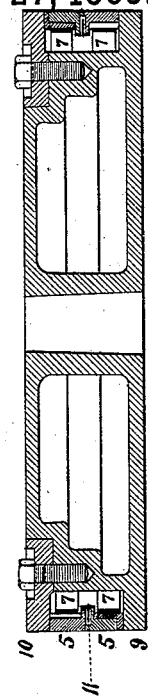
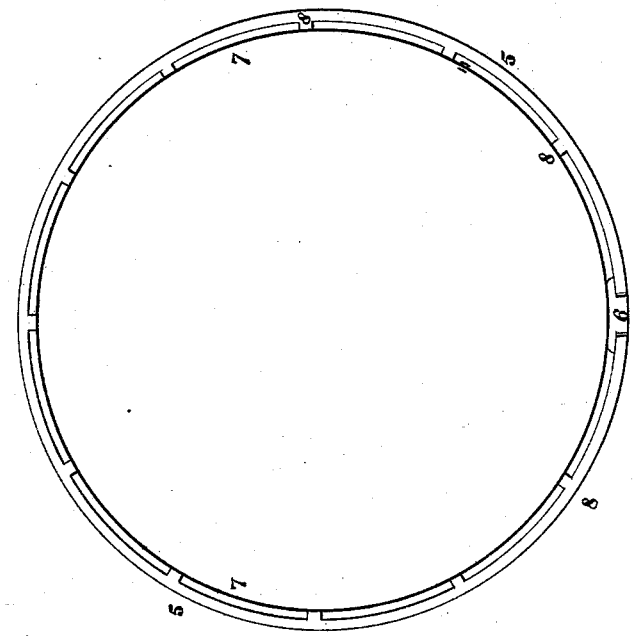
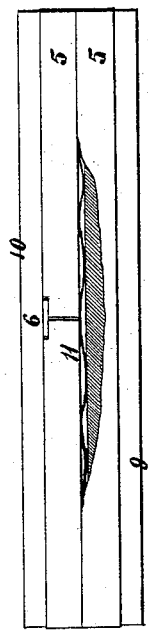
Witnesses
James T. Tobin
Harry Drury
Inventor
William Rowan
by his Attorneys
Howson & Son

UNITED STATES PATENT OFFICE.

WILLIAM ROWAN, OF BELFAST, IRELAND.

PISTON.

SPECIFICATION forming part of Letters Patent No. 273,161, dated February 27, 1883.

Application filed January 15, 1883. (No model.) Patented in England May 23, 1877, No. 2,013.

*To all whom it may concern:*

Be it known that I, WILLIAM ROWAN, residing at Belfast, in the county of Antrim, Ireland, have invented certain new and useful Improvements in Pistons, (for which I obtained British Letters Patent, No. 2,013 of 1877,) of which the following is a specification.

My invention relates to pistons used in steam-engines and other motors and machines, and of the kind in which two metal rings are fitted between flanges or between a flange and a junk-ring on the piston, each ring being cut through at one part, and being capable of distention by means of internal springs, so as to be kept in contact with the internal sides of the cylinder in which the piston works; and the object of my invention is to provide in a better, more convenient, and simpler manner than heretofore for the proper distention of such piston-rings, and also for maintaining close contact of the rings with the flanges or with the flange and junk-ring of the piston. I use a single band, of steel or other suitable resilient metal, for distending each piston-ring, and I apply between the rings a narrow ring or washer, of similar metal and of an undulated form as viewed edgewise, so as to apply pressure tending to move the rings apart, and thereby holding them in close contact with the flanges or with the flange and junk-ring of the piston. Each distending spring-band is strained so as to assume an undulated form, and, in tending to become circular, applies the necessary distending pressure to the ring. The spring-ring applied between the piston-rings has an undulated form when unstrained, and when in its place has the undulations somewhat compressed, its pressure on the rings being due to its reaction or resistance to the compression.

In the accompanying drawings, Figure 1 is a plan of one of the piston-rings with its distending-spring; and Fig. 2 is a plan of a piston of the kind having a junk-ring, but shown with the junk-ring removed. Fig. 3 is a sectional side view of the piston, and Fig. 4 is a diametrical section of the piston.

Each piston-ring 5 is cut through at one part, where the usual tongue, 6, is fitted, to prevent passage of steam through the cut. The distending-spring is a spring-metal band, 7, which may be made out of a straight band, bended, and having its ends joined by a clip or otherwise. This spring-band 7 is made of such a size as when in a circular form, as shown in Fig. 1, to distend the piston-ring 5 to its utmost, and when the piston-ring is contracted or drawn in (by means of a temporary external band) so as to enter the cylinder the spring-band 7 is made to assume the undulated form shown in Fig. 2. This undulated form is produced by the action of projections 8, which are shown as formed on the inside of the piston-ring 5, but which will obviously act equally well if upon the spring-band 7 itself. Being strained into the undulated form, the spring-band 7 tends to recover its circular form, and in doing so applies a distending pressure to the piston-ring 5.

It is essential to the proper action of the piston-rings 5 5 that their outer edges, at right angles to the axis of the piston, should be maintained closely in contact with the flanges of the piston, or one with the flange 9 and the other with the junk-ring 10 of the piston. The piston-rings 5 5 are formed with flanges projecting inward at their meeting edges, and in the flanged edge of one of the piston-rings there is formed a shallow groove to receive the spring-ring 11, by which they are pressed apart from each other and each against the flange or junk-ring of the piston. This spring-ring 11 may be described as a narrow washer of large diameter or as a flat ring to which an undulated form has been given, the ring being bended alternately to opposite sides of its plane. When the spring-ring 11 is in its place it is subjected to compression, which tends to flatten out the undulations, and in resisting this compression or reacting against it it tends to press the piston-rings 5 5 apart, as required. When the piston has two flanges formed on it, instead of having a removable junk-ring for one flange, the piston-rings 5 5, the distending spring-bands 7 7, and the spring-ring 11 are temporarily distended in order to get them over one of the flanges and into their places.

I am aware that it has been proposed to combine a corrugated spring with the rings of a piston; but the resiliency was not due in such case to the corrugations, which were normal, and were for the alleged object of increasing the number of bearing-surfaces of the spring over a plain curved spring. In my improvement the spring is a complete metal band normally of a plain circular form, but strained into an undulating form, the resiliency being due entirely to the undulations.

I claim as my invention—

1. The combination of the split ring of a piston with a spring composed of a metal band normally of a circular form, but strained, when in position within the ring, into an undulating form, substantially as set forth.

2. The combination of the split ring of a piston with a spring composed of a circular metal band and projections 8, for imparting an undulating form to the band when placed within the ring.

3. The combination of the two adjoining split rings of a piston with an intermediate annular washer, 11, of an undulating form, substantially as and for the purpose set forth.

In testimony whereof I have signed my name to this specification in the presence of two subscribing witnesses.

WILLM. ROWAN.

Witnesses:
  CHAS. H. BRETT,
        *Solr. Belfast.*
  ALEX. RENNIE,
        *His Clerk.*